Figure 1:
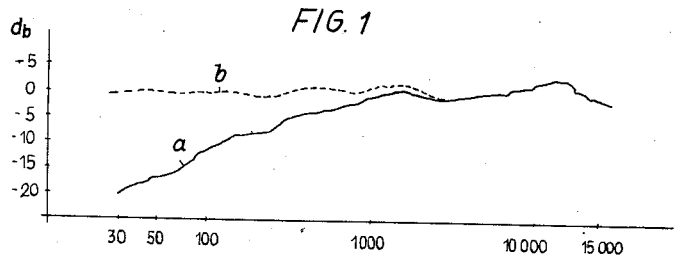

June 7, 1960    R. GÖRIKE    2,939,922
DIRECTIONAL MICROPHONE HAVING A LOW
SUSCEPTIBILITY TO SHOCK AND WIND
Filed May 22, 1956    4 Sheets-Sheet 1

INVENTOR.
RUDOLF GÖRIKE
BY
ATTORNEY

June 7, 1960 R. GÖRIKE 2,939,922
DIRECTIONAL MICROPHONE HAVING A LOW
SUSCEPTIBILITY TO SHOCK AND WIND
Filed May 22, 1956 4 Sheets-Sheet 2
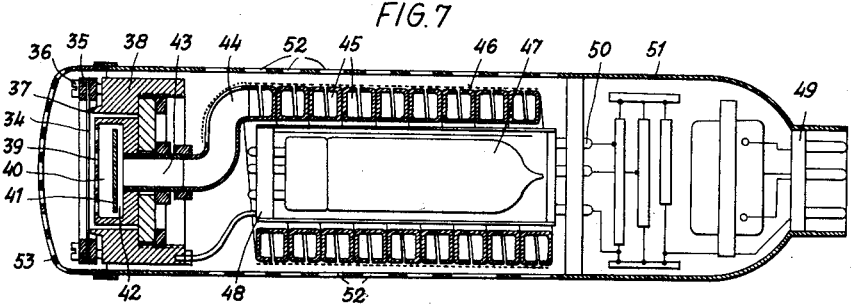
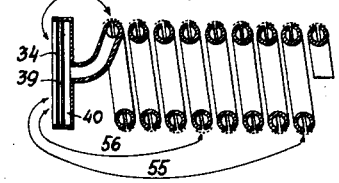
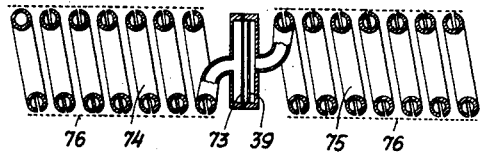
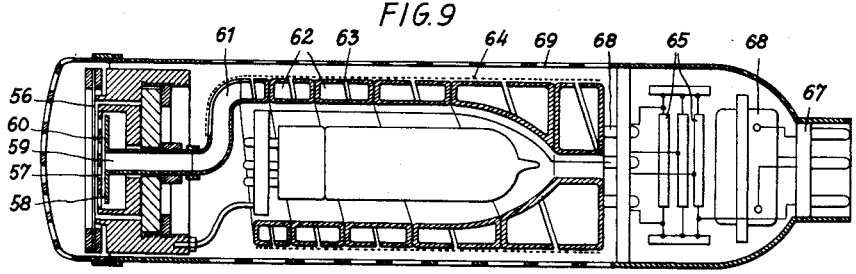
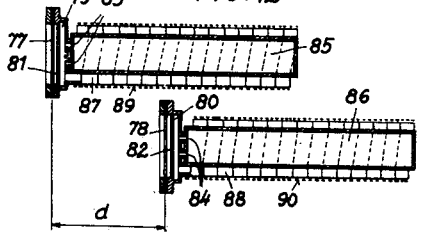
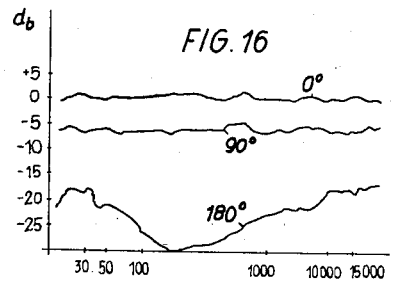
INVENTOR.
RUDOLF GÖRIKE
BY
ATTORNEY

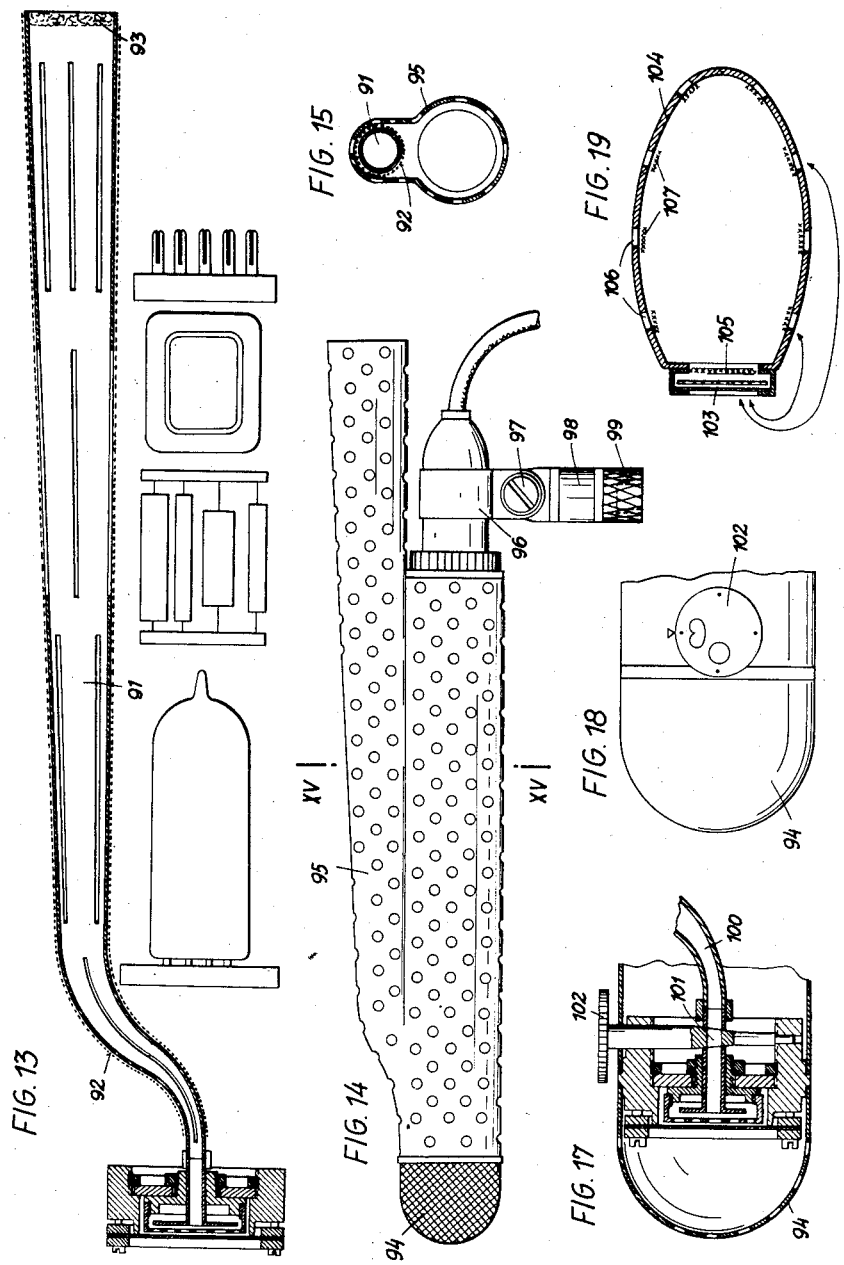

June 7, 1960

R. GÖRIKE 2,939,922

DIRECTIONAL MICROPHONE HAVING A LOW
SUSCEPTIBILITY TO SHOCK AND WIND

Filed May 22, 1956

4 Sheets-Sheet 4

INVENTOR.
RUDOLF GÖRIKE
BY
ATTORNEY

United States Patent Office 2,939,922
Patented June 7, 1960

2,939,922
DIRECTIONAL MICROPHONE HAVING A LOW SUSCEPTIBILITY TO SHOCK AND WIND

Rudolf Görike, 18 Gregor Mendelstrasse, Vienna, Austria

Filed May 22, 1956, Ser. No. 586,533

Claims priority, application Austria May 26, 1955

17 Claims. (Cl. 179—121)

The invention relates to directional microphone operating as an elongation transmitter or as an electromagnetic transducer.

The nature of the invention will be explained with reference to elongation transmitters, more particularly with reference to an example of a condenser microphone. Directional condenser microphones may be divided into two groups in dependence on their physical effect. The first group comprises microphones whose effect is based on the interference of the sound waves, e.g. microphones having reflectors or long duct systems, whose dimensions reach the order of the wavelength of the lowest frequency transmitted. The second group includes microphones responsive to the pressure difference of two adjacent points of the sound field; they are known as pressure gradient transmitters. In that type the pressure gradient increases linearly with an increasing frequency until the sound detour from the front side of the diaphragm around the microphone condenser unit to the rear side of the diaphragm reaches the order of half the wavelength. At that wavelength the pressure gradient is twice the value of the sound pressure. A further increase in frequency will first cause the pressure gradient to pass through the value zero, when the sound path corresponds to an entire wavelength, and will thereafter follow a Bessel function. To avoid that region of fluctuation, condenser microphones have previously be kept so small in size that the distance between the adjacent points, i.e. the length of the sound path from the front side of the diaphragm around the condenser unit to the rear side of the microphone corresponds approximately half the wavelength of the highest frequency transmitted. In practice, however, the condenser unit is made about 3 cm. in diameter and the directional effect of the condenser unit is utilized for the highest frequencies; in that range the condenser unit operates only as a pressure transmitter.

From the foregoing it is apparent that the pressure gradient decreases linearly with decreasing frequency, i.e. with increasing wavelength, to reach relatively low values at low frequencies. In order to obtain with such a microphone a constant alternating voltage in the range of the frequencies to be transmitted in the plane sound field at constant sound pressure, the natural frequency of the diaphragm must be laid into the centre of the frequency range transmitted and an adequate frictional resistance must be provided for. In practice such microphones have been found to be undesirably susceptible to wind and shock.

Magnetic microphones contain generally an armature which consists of magnetically soft material and is arranged with freedom of vibration at a small distance from one or several poles of a magnetic system and mechanically connected to or forms a diaphragm. In view of the fact that an attracting force is set up between the armature and the pole of the magnetic system, which is equipped with a permanent magnet, the mechanical returning force of the armature must be sufficient to maintain between the armature and the pole the distance required to permit of a vibration of the armature. Thereby the armature is given a natural frequency of some hundred cycles per second.

The pressure gradient, which acts as a driving force also in magnetic directional microphones, is in this case also dependent on the frequency and decreases linearly with decreasing frequency. To achieve a horizontal frequency response curve that decline would have to be compensated by displacing the natural frequency of the armature to the lower limit of the transmitted frequency range. This is not possible in a magnetic microphone owing to the attraction between the armature and pole.

According to the invention the decline of the frequency response occurring with the said directional microphones, particularly with condenser microphones whose diaphragm is much more strongly gripped and has, therefore, a much higher natural frequency than the previously designed microphones, and with magnetic microphones, is compensated according to the invention by an increase of the sound path. To this end the invention provides means defining at least one elongated cavity coupled to at least one side of the diaphragm and being longer than the shortest wavelength and shorter than the longest wavelength of said frequency range, said means being apertured at points having different distances from said diaphragm. The arrangement of the points where said means are apertured particularly the distance of the point where said means are apertured next to the diaphragm, and the distribution of the openings or the length of the slots is of great importance. In preferred embodiments of the invention the elongated cavity may be formed by a tube having a uniform cross-section or a cross-section increasing towards the free end of the tube, or, instead of a single tube, a bundle of tubes of stepped length may be used. To save space the elongated cavity may be arranged in a spiral or helical configuration. Moreover, the diaphragm may be directly coupled to the short tube whereas another, long tube much larger in diameter is connected to the transmitter condenser unit. In another embodiment of the invention the elongated cavity may be oval in longitudinal section and openings suitably covered with damping material may be distributed over its surface. With magnetic directional microphones the arrangement may be such that the front side of the diaphragm is directly exposed to the sound field whereas the rear side of the diaphragm forms together with a rigid plate a flat air chamber, that is, an air chamber of small depth, to which one or several acoustic impedances are coupled, at least one of which is exposed to the sound field in the form of a tube having lateral apertures, in order to increase the pressure gradient; said tube is longer than the shortest wavelength and shorter than the longest wavelength of the frequency range to be transmitted.

According to the principle of the invention it is possible to construct condenser microphones having a bidirectional or a unidirectional (cardioid) directional pattern and to provide second order condenser microphones having the analytical function $$e = e_0(\cos \varphi + \cos^2 \varphi)$$

and having a susceptibility to shock and wind not higher than the previously known first order condenser microphones having the analytical equation $e = e_0(1 + \cos \varphi)$.

Figure 2:
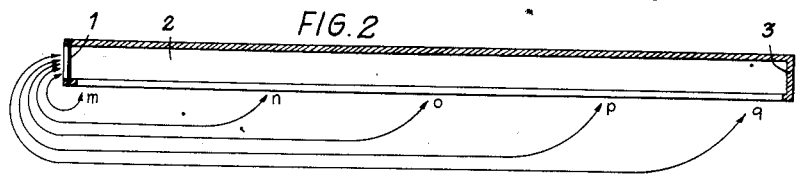
Figure 3:
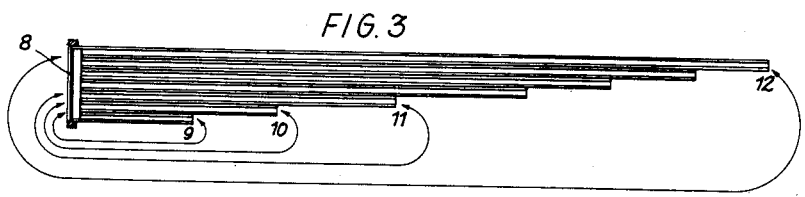
Figure 10:
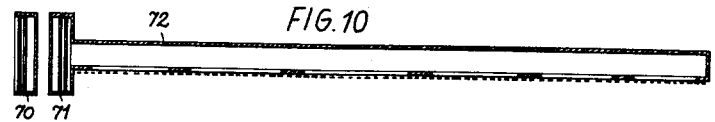
Figure 20:
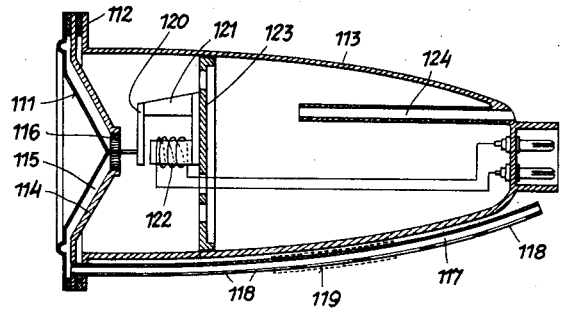
Figure 21:
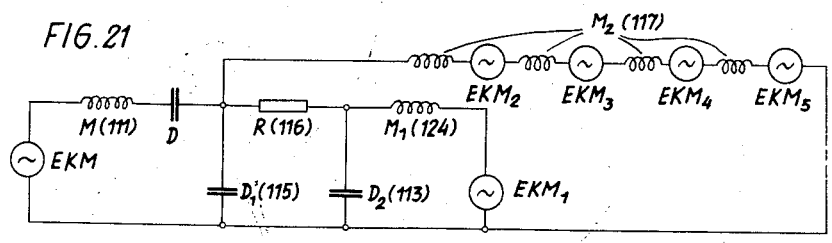
Figure 22:
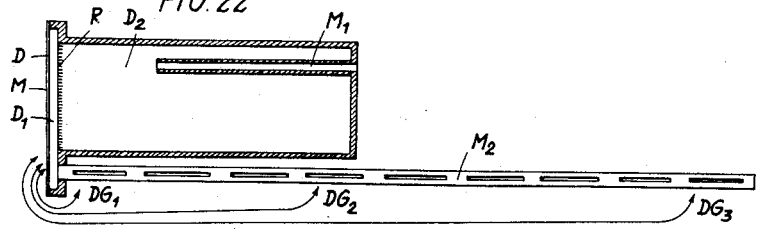
Figure 23:
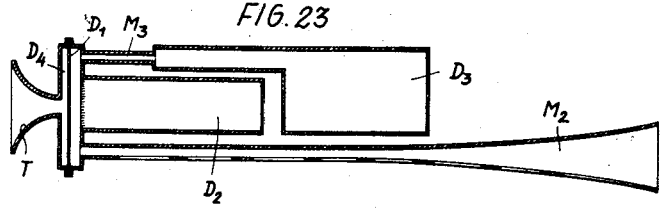

Other features of the invention will be apparent from the following description of the accompanying drawings, in which the nature of the invention is explained more fully with reference to illustrative embodiments. Fig. 1 shows a comparison of the frequency response curve of a directional condenser microphone according to the invention (b) and of a directional microphone of known type, but with a diaphragm tuned to a high natural frequency. Fig. 2 is a diagrammatic showing of the principle of the invention. Fig. 3 shows a modification of the construction shown in Fig. 2. Figs. 4 to 6a show additional forms of the oblong cavity coupled to the diaphragm. Figs. 7 to 9 show a complete condenser microphone with the necessary circuit elements, the cylindrical or conical tube being wound to form a spiral in order to save space. Figs. 10 and 11 show diagrammatically the arrangement of a microphone having a bidirectional pattern. Fig. 12 shows the arrangement with a microphone having a second order directional pattern. Fig. 16 shows the frequency response curve obtainable with a microphone according to Figs. 13 and 14. Fig. 13 shows a condenser unit having connected thereto an offset conical tube, together with the arrangement of the circuit elements of the amplifier. Fig. 14 is an external view of the microphone shown in Fig. 13. Fig. 15 is a sectional view taken on line XV—XV of Fig. 14. Figs. 17 and 18 show a mechanical shutter for controlling the directional pattern. Fig. 19 shows a condenser microphone in which the oblong cavity adjoining the diaphragm is of oval longitudinal section. Fig. 20 shows a magnetic microphone which embodies the features of the invention. Fig. 21 shows the equivalent electric circuit diagram of the microphone according to Fig. 20. Fig. 22 is a simplified showing of the microphone according to Fig. 20 and Fig. 23 is a diagrammatic view of another embodiment of a magnetic directional microphone.

A directional microphone in which the sound path around the microphone condenser unit corresponds only to about half the wavelength of the highest frequency transmitted and in which the diaphragm has a high natural frequency has a frequency response curve according to curve $a$ in Fig. 1. The curve $b$ is achievable by providing according to the invention the elongated, apertured cavities to increase the pressure gradient.

Fig. 2 is a diagrammatic showing of the principle of the invention in its simplest form. The diaphragm 1 closes an elongated cavity 2, which may be open or closed at 3. The cavity 2 has a longitudinal slot or a series of slots or bores, which are suitably covered with an acoustic frictional resistance, such as textile material. Thus sound inlets $m$ to $q$ into the interior of the tube are formed.

In the construction described the elongated cavity has four fuctions:

(1) To increase the sound path between the front and rear sides of the diaphragm without occurrence of interference.

(2) To cause an acoustic mass loading of the diaphragm to reduce the natural frequency thereof.

(3) To act as an acoustic filter; this means that the sound entering at $m$ reaches the rear side of the diaphragm practically without loss whereas the sound entering the tube at $q$ is subjected to a frequency-dependent damping before it meets the rear side of the diaphragm, the losses increasing with increasing frequencies.

(4) To suppress, by the slots or bores and the damping means at the openings to the elongated cavities, the formation of standing waves inside the cavity.

Since the distance from the front side of the diaphragm to the sound inlet $m$ (Fig. 2) is relatively small, an effective pressure gradient will be produced only for the highest sound frequencies. On the other hand, the pressure gradient for the sound waves entering at $q$ is high even at low frequencies owing to the large distance from the diaphragm. For high frequencies, however, the pressure gradient is subjected to great fluctuations because the distance is a multiple of the wavelength. On the other hand, the filtering action of the damped openings will prevent sound waves of higher frequency to pass from $q$ in the interior of the tube to the diaphragm. All other values lie between these two extremes. In a practical construction the distance between the front side of the diaphragm and $m$ was 2 cm. whereas as distance of 30 cm. was measured to sound inlet $q$.

As is shown in Fig. 3, a bundle of open tubes of stepped length can be used instead of one hollow body. The diaphragm 8 is acoustically coupled at its rear to the tubes. The sound inlets are at the tube ends 9 to 12.

Due to the openings in the elongated hollow body shown in Fig. 2 and to the stepping of the tubes according to Fig. 3 fluctuations of the pressure gradient as a driving force at the diaphragm are avoided.

It has been attempted already to increase the pressure gradient in an elongation transmitter by increasing the sound path between the front and rear sides of the microphone by surrounding mechanical structures. In doing so it was inevitable to have the pressure gradient reach the value zero in the transmitted range already when the sound path became equal to the wavelength. That fact caused fluctuations in the frequency response, which could be alleviated only by enlarging the diaphragm or the microphone casing and operating the microphone in the higher frequency range as a directional pressure microphone.

Such disturbances are not possible in the microphone according to the invention because neither fluctuations of the pressure gradient nor standing waves inside the elongated cavity coupled to the diaphragm will occur. If the slot or one of the openings in the elongated cavity extends close to the rear side of the diaphragm, the directional effect will be obtained without a pressure boost even with small diaphragms. In the embodiment according to Fig. 3 the stepping and the damping of the narrow tubes have also the effect of eliminating the disturbances.

Figures 4, 4A:
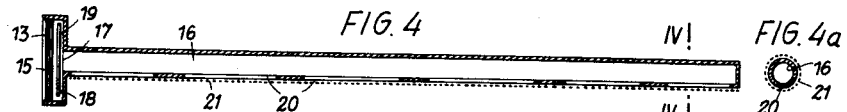

In the embodiment according to Fig. 4 the diaphragm 13 is gripped in the casing 14. The electrode formed with bores 15 is slightly spaced from the diaphragm 13. The tube 16 of uniform cross-section, formed with slots, opens at 17 into the casing 14. A disc 18 defines at 19 a narrow slot forming an acoustic frictional resistance. A variation of the frictional resistance to obtain an optimum frequency and directional response of the microphone is possible by varying this slot, which may be effected also from the outside by mechanical means. The frequency response is also determined by the arrangement of the slots 20 and of the acoustical frictional resistance 21.

Figures 5, 5A:
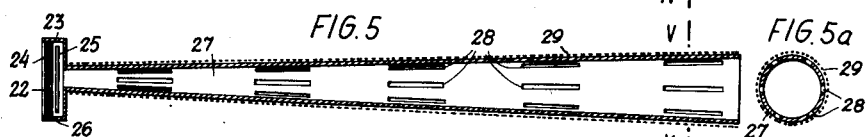

Fig. 5 shows another embodiment having a tube whose cross-section increases continuously towards the free end. The diaphragm 22 is slightly spaced in the casing 23 from the perforated electrode 24. The plate 25 is also slightly spaced from the electrode 24 so that an acoustic frictional resistance 26 is obtained. The conical tube 27 formed with slots 28 and an acoustic frictional resistance 29 opens at its small end into the casing 23.

The damping material may be disposed at intervals or in a regular distribution inside the elongated hollow bodies or may be provided on the inside wall itself. It is also possible to form the elongated hollow body itself of damping material, e.g. felt, rubber and the like, which causes the higher sound frequencies to be absorbed.

Figures 6, 6A:
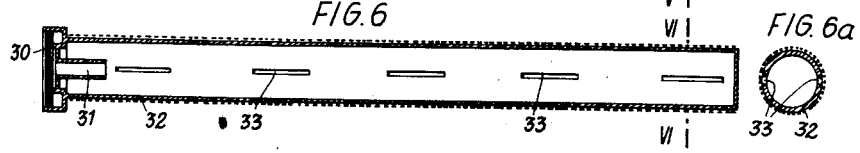

Fig. 6 shows an embodiment which contains a microphone condenser unit, whose diaphragm 30 is acoustically coupled to a short tube 31. A long tube 32 much longer in diameter is connected to the microphone condenser unit and formed with slots 33. An acoustic frictional resistance is provided over the slots.

Fig. 7 shows a complete condenser microphone comprising a condenser unit, whose diaphragm 34 is gripped in a ring 35. The diaphragm may be drawn over the annular projection 37 of the retaining ring 38 by tensioning screws 36 to provide for a uniform tension enabling the diaphragm to be adjusted to a natural frequency between 8,000 and 15,000 c./s. The perforated electrode 39 is slightly spaced behind the diaphragm and closes a cavity 40 containing the disc 41 defining a narrow air gap at 42. The tube 43 leads from the cavity 40 into the curved tube 44, which is connected to the tube 45 wound to form a spiral. In this embodiment the tube 45 is of square cross-section and is formed in its periphery with slots, on which damping material 46 is applied. The convolutions of the tube 45 define a cavity, in which the amplifier tube 47 and its base 48 are inserted. The microphone casing contains also the circuit elements and the transformer, as well as the plug 49. Another plug coupling 50 enables the withdrawal of the casing tube 51 with the coiled tube 45, the circuit elements, the transformer and the plug to enable a replacement of the amplifier tube. The casing tube 51 is formed with numerous openings at 52. The cap 53 consists of wire mesh or perforated or slotted sheet metal and serves to protect the microphone condenser unit.

Fig. 8 gives a clear showing of the path of the sound waves in the construction shown in Fig. 7. The shortest path 54 and the longest path 55 are apparent. All other paths lie between these extremes. The middle path is shown at 56. In Fig. 9 the diaphragh 56 is slightly spaced from the perforated electrode 57. Slightly spaced behind the same is the disc 58 with a short tube 59. Thus a narrow air gap is formed at 60. The coiled conical tube 62 is connected by means of the curved tube 61 to the narrow tube 59 and is formed with slots 63, on which the acoustic frictional resistance 64 is arranged.

The microphone contains the circuit elements 65, the transformer 66 and the plug 67. The plug coupling 68 enables the withdrawal of the casing tube 69 with the conical tube 62. Fig 10 shows a condenser microphone which consists of two condenser units 70 and 71 electrically connected in opposition. This would provide for a bidirectional pattern. One condenser unit has connected thereto the tube 72 constructed according to the invention. Whereas the condenser unit 70 constitutes a normal pressure transmitter, the condenser unit 71 consists of parts of a pressure transmitter but with a tube coupled through a flat air chamber to the front side of the diaphragm and formed with openings and an acoustic frictional resistance according to Fig. 4.

Fig. 11 shows diagrammatically the arrangement of a microphone having a bidirectional pattern. Tubes 74, 75 coiled to a spiral are connected to both sides of the firmly gripped diaphragm 73 and are formed with slots or bores provided with damping material 76.

Fig. 12 shows the arrangement of a condenser microphone with a second order directional pattern according to the equation $e = e_0 (\cos \varphi + \cos^2 \varphi)$. Two identical microphones are offset by the distance $d$. The condenser units of these systems are electrically connected in opposition. Flat air chambers 79 and 80, that is chambers of small depth, are disposed behind the diaphragms 77 and 67, which are mechanically prestressed to about 1000 c./s. The electrodes 81, 82 are disposed directly behind the diaphragm in the flat air chambers. The flat air chambers have connected thereto the acoustic frictional resistances 83 and 84, which open into the air chambers 85 and 86. The air chambers 79 and 80 have further connected thereto the spirally wound tubes 87 and 88, which are formed with slots or other openings, on which frictional resistances 89 and 90 are applied. In spite of the mechanical prestressing of the diaphragms to tune them to about 1000 c./s. these microphones have a straight frequency response down to 30 c./s. and a unidirectional response according to the equation $e = e_0 (\cos \varphi + \cos^2 \varphi)$.

The tapering tube may be connected by means of an offset portion to the condenser unit to enable an arrangement of the amplifier with circuit elements and transformer according to Fig. 13. The conical tube 91 is formed at its end near the condenser unit with two slots and the number of slots increases towards the end of the conically widening tube. A textile covering 92 is applied, e.g., with the aid of spirally wound band, on the conical tube. The free end of the conical tube may be open or may be closed by a material 93 which may be sound reflecting or sound absorbent, e.g. by a felt plug. Fig. 14 is an etxernal view of the microphone according to Fig. 13. A grid cap 94 is provided to protect the condenser unit. The conical tube and the amplifier arrangement are mechanically protected by a perforated casing tube 95. The plug 96 carries an articulated joint 97, to which a resilient support, e.g. a rubber buffer 98 is affixed. The other side of the rubber buffer carries the threaded connection 99 for the stand. Fig. 15 shows a microphone in a transverse sectional view taken on line XV—XV of Fig. 14.

Fig. 16 shows the frequency response curve of a microphone according to Figs. 13 and 14. It is apparent that the frequency response curve extends horizontally in the important sound frequency region at zero degrees sound incidence. The curve for 90 degrees sound incidence lies about 6 db below the zero degrees curve. At 180 degrees sound incidence the frequency response curve is not so smooth but lies 20 db below the zero degree curve, on an average, so its irregularity will not be disturbing.

In all embodiments according to the invention the connection between the condenser unit to the tube may be closed to convert the microphone from one having a cardioid pattern to one having an omnidirectional pattern.

Fig. 17 is a diagrammatic view of an illustrative embodiment. A mechanical shutter 101 is disposed in the conduit 100 and has a knob 102 provided with symbols of the patterns to which the microphone can be adjusted. Fig. 18 is a detail view showing the knob in plan. The shutter can be turned to close the condenser unit entirely on the rear so that the sound impinges the diaphragm only on its front side. Thus a pressure transmitter is obtained having the known transmitting properties with an omnidirectional pattern. Directional patterns between omnidirectional and cardioid can be adjusted by constructing the cross-section between the condenser unit to the conical tube.

Fig. 19 shows a condenser microphone having a diaphragm 103, which is directly exposed on one side to the sound field and is coupled on the other side by means of an acoustic resistance 105 to an oval hollow body 104. The oval hollow body has openings 106, which are provided with acoustic damping material 107. The openings are arranged to provide sound paths of different length around the diaphragm. The amplifier components may be accommodated inside the hollow body. The invention may also be applied in circuits using no transformer, particularly according to the known cathode follower circuit or in a high-frequency circuit.

Fig. 20 illustrates the application of the invention to magnetic microphones. The diaphragm 111 is affixed to the rim 112 of the casing 113. A rigid plate 114 is arranged to form a flat air chamber 115. An opening provided with an acoustical frictional resistance 116 leads from that chamber into the cavity of the casing 113. A tube 117 leads from the chamber into the open.

The tube 117 is provided in the direction of its length with openings (shown as a slot 118 in Fig. 20), which may be covered by an acoustic frictional resistance 119.

The needle which connects the diaphragm 111 to the armature 120 of the magnetic system extends through the acoustic frictional resistance 116, which may consist, e.g., of textile fabric. The magnet 121 and the winding 122 are parts of the magnetic system which is affixed to the retaining plate 123 formed with apertures. A tube 124 leads into the interior of the casing 113 to increase, in a manner known per se, the driving force acting on the diaphragm due to the sound pressure in the lower frequency region.

Fig. 21 shows the electrical equivalent circuit diagram of the arrangement according to Fig. 20. The diaphragm 111 having the mass M and being subject to a restoring force D at its rim forms together with the restoring force $D_1$ of the air chamber 115 a resonant circuit which is resonant at the upper limit of the transmission range.

The opening 116 with the acoustic frictional resistance R enables an equalization of air from chamber 115 into chamber 113 with the returning force $D_2$. The tube 124, having the acoustic mass $M_1$, opens also into the chamber 113. EMK denotes the sound waves incident on the front side of the diaphragm 111. $EMK_1$ denotes the sound waves entering the tube 124, which provide an additional driving force at the diaphragm. The air chamber 115 has also connected to it a tube 117, whose total acoustic mass $M_2$ consists of sections corresponding to the lateral openings of the tube. $EMK_2 \ldots EMK_5$ denote the driving forces exercised by the sound waves which enter the openings.

To illustrate the operation the acoustic elements of Fig. 20 are shown in Fig. 22 without details of construction. The sound pressure acts directly from the front side on the diaphragm M, whereas the sound waves entering through the slotted tube $M_2$ are effective on the rear side after filtering. $DG_1$ denotes the shortest sound path, $DG_2$ the middle one, and $DG_3$ the longest. The mean of the driving force corresponds to the sound path $DG_2$, which is equivalent to a diaphragm radius of the same size. Owing to the elasticity of the air chamber $D_2$ the sound waves entering the tube $M_1$ are so displaced in phase as to become effective in the same direction as the sound waves acting on the front side of the diaphragm.

Fig. 23 shows the same arrangement as Fig. 22 excepting the tube M. To increase the efficiency in the lower frequency range the flat air chamber behind the diaphragm has connected thereto the tube $M_3$, which leads into the chamber $D_3$ to provide resonance at about 50 c./s.

In front of the diaphragm a horn T may be disposed to form an air chamber $D_4$ and influence in a manner known per se the frequency response curve in the higher frequency region.

Instead of only one tube, two or more tubes may be connected to the air chamber behind the diaphragm. The tubes may have identical or different slot arrangements. In the magnetic microphone it is also possible to use a four-pole system instead of the two-pole system shown in Fig. 20.

The invention is also applicable to piezo microphones, which belong also to the elongation transmitters, in which the alternating electric voltage is a function of the deflection of the vibrating system from the position of rest. In the piezo microphone the diaphragm is coupled according to the invention to the tubular cavity whereas the crystal is mechanically connected to the diaphragm.

In condenser operation the mechanical prestressing of the diaphragm enables a relatively small electrode spacing (15 microns and less) and a relatively high polarizing voltage (120 volts and more). Thus a high efficiency of the microphone can be obtained. The diaphragm may consist of aluminum alloy, nickel, beryllium bronze or another metallic or non-metallic material having a strength sufficient to permit of a mechanical stressing of the diaphragm. The surface of a non-metallic material is rendered electrically conductive, e.g. by an atomization of metal in a vacuum.

I claim:

1. A directional microphone for transmitting a predetermined range of frequencies which are audible by the human ear, comprising a diaphragm, means defining at least one elongated cavity coupled to one side of said diaphragm and which has a length lying between the shortest wavelength and the longest wavelength of said range of frequencies, said means defining at least one elongated cavity including apertured portions disposed at points having different distances from said diaphragm to expose said one side of the diaphragm to the sound field surrounding the microphone, and mounting means carrying said diaphragm and exposing the other side of said diaphragm to the sound field surrounding the microphone.

2. A directional microphone as set forth in claim 1, which comprises a magnetic transmitter having a magnetic system including an armature mechanically connected to said diaphragm.

3. A directional microphone as set forth in claim 1, in which said means comprise a tube of uniform cross-section.

4. A directional microphone as set forth in claim 1, in which said means comprise a tube having a free end and increasing in cross-section towards said free end.

5. A directional microphone as set forth in claim 1, in which said means comprise a bundle of tubes of stepped length.

6. A directional microphone as set forth in claim 1, which comprises a condenser unit, including said diaphragm, and in which said means comprise a relatively short tube directly coupled to said diaphragm and a relatively long tube larger in diameter than the short tube and connected to said condenser unit.

7. A directional microphone as set forth in claim 1, in which said cavity is oval in longitudinal section and said means are formed with openings distributed over the surface of said cavity.

8. A directional microphone as set forth in claim 1, which comprises means defining a flat air chamber between the diaphragm and said cavity.

9. A directional microphone as set forth in claim 1, which comprises means defining an air chamber connected to the diaphragm in parallel to said cavity.

10. A directional microphone as set forth in claim 1, in which said means defining said cavity are formed with at least one slot.

11. A directional microphone as set forth in claim 1, which comprises a mechanical shutter adjustably disposed to locally constrict the cross-section of said cavity to adjust the directional pattern of the microphone.

12. A directional microphone as set forth in claim 11, which comprises a condenser unit including said diaphragm and having said cavity coupled thereto and in which said shutter is disposed where said cavity is connected to said condenser unit.

13. A directional microphone as set forth in claim 1, which comprises a horn connected to the front side of the diaphragm to affect the frequency response in the higher part of said frequency range.

14. A directional microphone as set forth in claim 1, in which the front side of the diaphragm is directly exposed to the sound field and which comprises a rigid plate defining with the rear side of said diaphragm a flat air chamber between said diaphragm and said cavity which constitutes an acoustic impedance.

15. A dircetional microphone as set forth in claim 14, which comprises a magnetic transmitter.

16. A directional microphone as set forth in claim 14, which comprises means defining at least one additional acoustic impedance coupled to said flat air chamber.

17. A directional microphone as set forth in claim 14, in which said means defining said cavity comprise a tube formed with lateral openings.

References Cited in the file of this patent

UNITED STATES PATENTS

| | | |
|---|---|---|
| 1,932,581 | Gilman | Oct. 31, 1933 |
| 2,210,415 | Kellogg | Aug. 6, 1940 |
| 2,225,312 | Mason | Dec. 17, 1940 |
| 2,228,886 | Olson | Jan. 14, 1941 |
| 2,299,342 | Olson | Oct. 20, 1942 |
| 2,301,638 | Olson | Nov. 10, 1942 |
| 2,401,328 | Black | June 4, 1946 |

Notice of Adverse Decision in Interference

In Interference No. 91,824 involving Patent No. 2,939,922, R. Görike, Directional microphone having a low susceptibility to shock and wind, final decision adverse to the patentee was rendered Feb. 27, 1963, as to claims 1, 3, 4, 5, 9 and 10.

[*Official Gazette August 20, 1963.*]